US010633752B2

(12) United States Patent
Glisan et al.

(10) Patent No.: US 10,633,752 B2
(45) Date of Patent: Apr. 28, 2020

(54) FEEDING SYSTEMS AND METHODS OF USING FEEDING SYSTEMS

(71) Applicant: ELYSIS LIMITED PARTNERSHIP, Montreal (CA)

(72) Inventors: Roy A. Glisan, Wexford, PA (US); Leroy E. D'Astolfo, Lower Burrell, PA (US); Derrick Lucey, Pittsburgh, PA (US); Mark Ripepi, Harrison City, PA (US)

(73) Assignee: ELYSIS LIMITED PARTNERSHIP, Montreal, Quebec (CA)

( * ) Notice: Subject to any disclaimer, the term of this patent is extended or adjusted under 35 U.S.C. 154(b) by 70 days.

(21) Appl. No.: 15/475,018

(22) Filed: Mar. 30, 2017

(65) Prior Publication Data

US 2017/0283969 A1  Oct. 5, 2017

Related U.S. Application Data (60) Provisional application No. 62/315,430, filed on Mar. 30, 2016.

(51) Int. Cl.
| | |
|---|---|
| *C25C 3/14* | (2006.01) |
| *B65G 53/18* | (2006.01) |
| *B65G 53/22* | (2006.01) |
| *B65G 53/66* | (2006.01) |

(52) U.S. Cl.
CPC ............... *C25C 3/14* (2013.01); *B65G 53/18* (2013.01); *B65G 53/22* (2013.01); *B65G 53/66* (2013.01)

(58) Field of Classification Search
USPC ......................................................... 406/171
See application file for complete search history.

(56) References Cited

U.S. PATENT DOCUMENTS

| | | | | |
|---|---|---|---|---|
| 3,006,825 | A | * | 10/1961 | Ovrom Sem ............. C25C 3/14 205/392 |
| 3,681,229 | A | | 8/1972 | Lowe |
| 3,870,374 | A | * | 3/1975 | Wentzel, Jr. ........... B65G 53/20 406/155 |
| 3,901,787 | A | * | 8/1975 | Niizeki ..................... C25C 3/14 204/245 |

(Continued)

FOREIGN PATENT DOCUMENTS

| | | |
|---|---|---|
| EP | 0506180 A1 | 9/1992 |
| WO | 2009147177 A1 | 12/2009 |

OTHER PUBLICATIONS

International Search Report and Written Opinion from International Application No. PCT/US2017/025185 dated Jun. 21, 2017.

*Primary Examiner* — Harry D Wilkins, III
(74) *Attorney, Agent, or Firm* — Gowling WLG (Canada) LLP; Damien Calvet (57) ABSTRACT

In one embodiment, a feed system for distributing fluidized feed material, comprises: a distribution unit configured to fluidize feed material; and a control unit fluidly coupled to the distribution unit, wherein the control unit comprises: a chamber configured to hold the feed material provided from the distribution unit; and a feeder unit fluidly coupled to the chamber: and a second gas inlet configured to provide gas to the chamber; and a material discharge pipe fluidly coupled to the chamber and the second gas inlet.

20 Claims, 8 Drawing Sheets

(56) References Cited

U.S. PATENT DOCUMENTS

| | | | | |
|---|---|---|---|---|
| 3,995,771 A | * | 12/1976 | Olivier | B65G 53/50 |
| | | | | 222/61 |
| 4,016,053 A | * | 4/1977 | Stankovich | B65G 53/04 |
| | | | | 204/245 |
| 4,203,689 A | * | 5/1980 | Kraxner | B65G 53/36 |
| | | | | 406/123 |
| 4,473,175 A | * | 9/1984 | Zengaffinen | B65G 47/19 |
| | | | | 222/452 |
| 4,692,068 A | | 9/1987 | Hanrot et al. | |
| 4,747,732 A | | 5/1988 | Hanrot et al. | |
| 4,938,848 A | | 7/1990 | Raines et al. | |
| 5,108,557 A | * | 4/1992 | Nordquist | C25C 3/14 |
| | | | | 204/245 |
| 7,407,346 B2 | * | 8/2008 | McConnell | B01D 46/002 |
| | | | | 406/171 |
| 2004/0247400 A1 | * | 12/2004 | Cloue | B65G 53/16 |
| | | | | 406/10 |
| 2006/0093444 A1 | * | 5/2006 | McConnell | B01D 46/002 |
| | | | | 406/197 |
| 2007/0110525 A1 | | 5/2007 | Karlsen et al. | |
| 2010/0118641 A1 | | 5/2010 | Bligh et al. | |
| 2014/0241818 A1 | * | 8/2014 | Tamagno | B65G 53/16 |
| | | | | 406/108 |
| 2014/0262808 A1 | * | 9/2014 | Liu | C25C 7/06 |
| | | | | 205/367 |

\* cited by examiner

FEEDING SYSTEMS AND METHODS OF USING FEEDING SYSTEMS

CROSS-REFERENCE TO RELATED APPLICATIONS

This application is a non-provisional patent application of and claims priority to U.S. provisional patent application Ser. No. 62/315,430, filed Mar. 30, 2017, the entirety of which is hereby incorporated by reference.

FIELD

Broadly, the present patent application relates to a feeding system and methods of using a feeding system for feeding alumina into a smelting cell.

BACKGROUND

Hall-Héroult electrolytic cells are utilized to produce aluminum metal in commercial production of aluminum from alumina that is dissolved in molten electrolyte (a cryolite "bath") and reduced by a DC electric current using a consumable carbon anode. Traditional Hall-Héroult electrolytic cells require only a few feed points per cell.

SUMMARY

The present disclosure is generally directed towards feed systems and related methods of use, where the feed system is configured with a gas supply, where the gas supply and system components are configured to cooperate to fluidize a feed material into a fluidized feed material, which is then directed via the feed system components and devices (detailed herein) to provide a tailored delivery of feed material (e.g. amount, rate, intensity) to different locations in an end use application (e.g. container, reactor, electrolysis cell, or other industrial applications).

In some embodiments, the disclosure is configured to current and future electrolytic cell technology which may seek to feed small amounts of alumina in non-traditional cells at numerous points (e.g. 20 to 100 or more feed points per cell) depending on the physical size of the cell. In some embodiments, non-traditional smelting cells using oxygen evolving anodes (e.g. inert anode technology) may be operated with close control of feed dispersion and/or the operating parameters of distributing and/or spreading the feed around the entire electrolytic cell while feeding near continuously.

In one embodiment, a feed system for distributing fluidized feed material, comprises: a distribution unit configured to fluidize feed material; and a control unit fluidly coupled to the distribution unit, wherein the control unit comprises: a chamber configured to hold the feed material provided from the distribution unit; and a feeder unit fluidly coupled to the chamber: and a second gas inlet configured to provide gas to the chamber; and a material discharge pipe fluidly coupled to the chamber and the second gas inlet.

In another embodiment, the feed material is alumina.

In some embodiments, the feed material is configured to be fluidized with gas. In some embodiments, the feed material is configured with properties and/or characteristics (e.g. average particle size, morphology, density, and/or composition) such that fluidization with a gas (e.g. air) to provide a flowable medium is achievable.

In another embodiment, the distribution unit comprises: a body having a first volume; and a first chamber, within the first volume, at a bottom of the body, wherein the first chamber is configured to distribute gas (e.g. air) to the feed material within the first volume; and a second chamber within the first volume and above the first chamber, wherein the second chamber is configured to hold the feed material. In some embodiments, the first volume is an area where fluidized material is flowing.

In another embodiment, the distribution unit comprises: a first fluidization fabric between the first chamber and the second chamber, wherein the feed material rests atop the fluidization fabric.

In another embodiment, the distribution unit further comprises: a feed material inlet pipe fluidly coupled to the first volume, wherein the feed material inlet pipe is configured to supply the feed material to the second chamber.

In another embodiment, the distribution unit further comprises: a pressure port, wherein the pressure port is configured to measure a depth of the feed material.

In another embodiment, the distribution unit further comprises: a first gas (e.g. air) inlet in the body, wherein the gas (e.g. air) inlet is configured to supply a gas (e.g. air) flow to the first chamber.

In another embodiment, the distribution unit further comprises: a filtration fabric within the first volume, wherein the filtration fabric is disposed above the second channel.

In another embodiment, the distribution unit further comprises: a vent at a top of the body.

In another embodiment, the control unit comprises: a fourth chamber configured to hold the feed material provided from the distribution unit; and a feeder unit fluidly coupled to the fourth chamber.

In another embodiment, the feeder unit comprises: a second gas (e.g. air) inlet configured to provide gas (e.g. air) to the fourth chamber; and a material discharge pipe fluidly coupled to the fourth chamber and the inlet.

In another embodiment, the feeder unit comprises: a point of entry device configured to break a crust formed at an opening of the smelting cell.

In one embodiment, the disclosed subject matter relates to a method of feeding a smelting cell, comprising: providing a feed material to a distribution unit, flowing gas (e.g. air) through the distribution unit, wherein the gas (e.g. air) fluidizes the feed material; and flowing a controlled amount of fluidized feed material from the distribution unit to a smelting cell via a control unit.

In another embodiment, the feed material is alumina.

In another embodiment, flowing the controlled amount of fluidized feed material comprises: flowing the fluidized feed material to a control unit comprising: a chamber configured to hold the feed material provided from the distribution unit; and a feeder unit fluidly coupled to the chamber, wherein the feed material is configured to be de-fluidized in the chamber.

In another embodiment, gas (e.g. air) is provided for a first period of time to the feeder unit to fluidize the feed material in the chamber.

In another embodiment, the fluidized feed material is discharged from a discharge spout in the feeder unit to the smelting cell.

In another embodiment, prior to discharging the fluidized feed material, a plunger is extended to form an opening in a crust formed at an opening of the smelting cell to allow feed material to enter the smelting cell.

In another embodiment, flowing gas (e.g. air) through the distribution unit further comprises: filtering the gas (e.g. air) from the distribution unit that passes through the feed material to remove feed material dust particles.

In one embodiment, the disclosed subject matter relates to a method of feeding alumina to a smelting cell, comprising: providing alumina to a distribution unit; flowing gas (e.g. air) through the distribution unit, wherein the gas (e.g. air) fluidizes the alumina; and flowing the fluidized alumina to a control unit comprising: a chamber configured to hold the alumina provided from the distribution unit, wherein the alumina is de-fluidized in the chamber, and a feeder unit fluidly coupled to the chamber; providing gas (e.g. air) for a first period of time to the feeder unit to fluidize the alumina in the chamber; and discharging a controlled amount of the fluidized alumina from a discharge spout in the feeder unit to the smelting cell.

In one embodiment, the disclosed subject matter relates to a method of feeding feed material to a destination, comprising: providing feed material to a distribution unit; flowing gas (e.g. air) through the distribution unit, wherein the gas (e.g. air) fluidizes the feed material; and flowing the fluidized feed material to a control unit comprising: a feeder unit fluidly coupled to the distribution unit; providing gas (e.g. air) for a first period of time to the feeder unit to fluidize the feed material in the control unit; and discharging a controlled amount of the fluidized feed material from a discharge spout in the feeder unit to the smelting cell.

BRIEF DESCRIPTION OF THE DRAWINGS

For a more complete understanding of the present disclosure, reference is made to the following detailed description of exemplary embodiments considered in conjunction with the accompanying drawings.

DETAILED DESCRIPTION OF EXEMPLARY EMBODIMENTS

Figure 1:
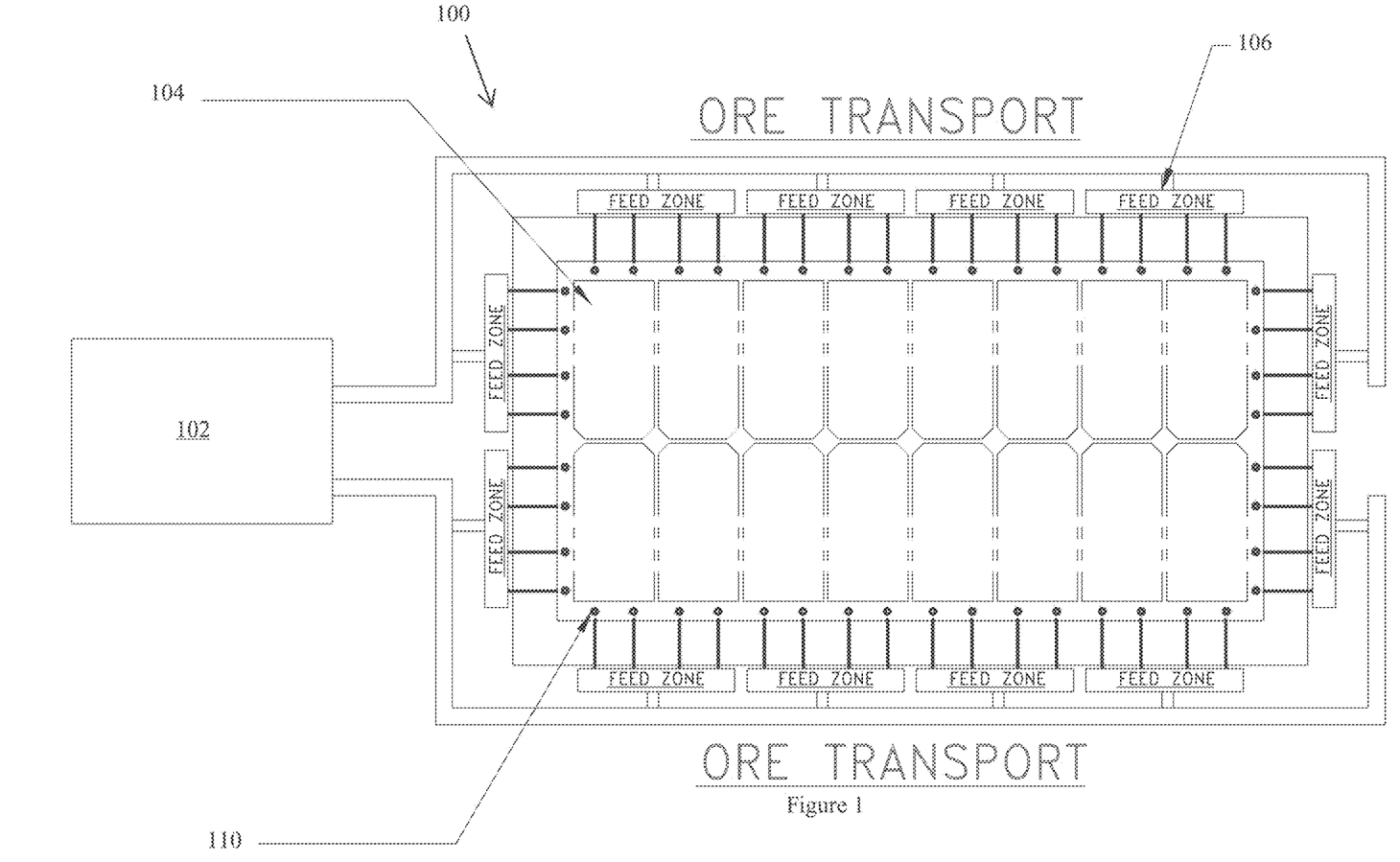
FIG. 1 depicts a schematic top view of a feed system in operative communication with alumina ore storage in accordance with some embodiments of the present disclosure.
Figure 2:
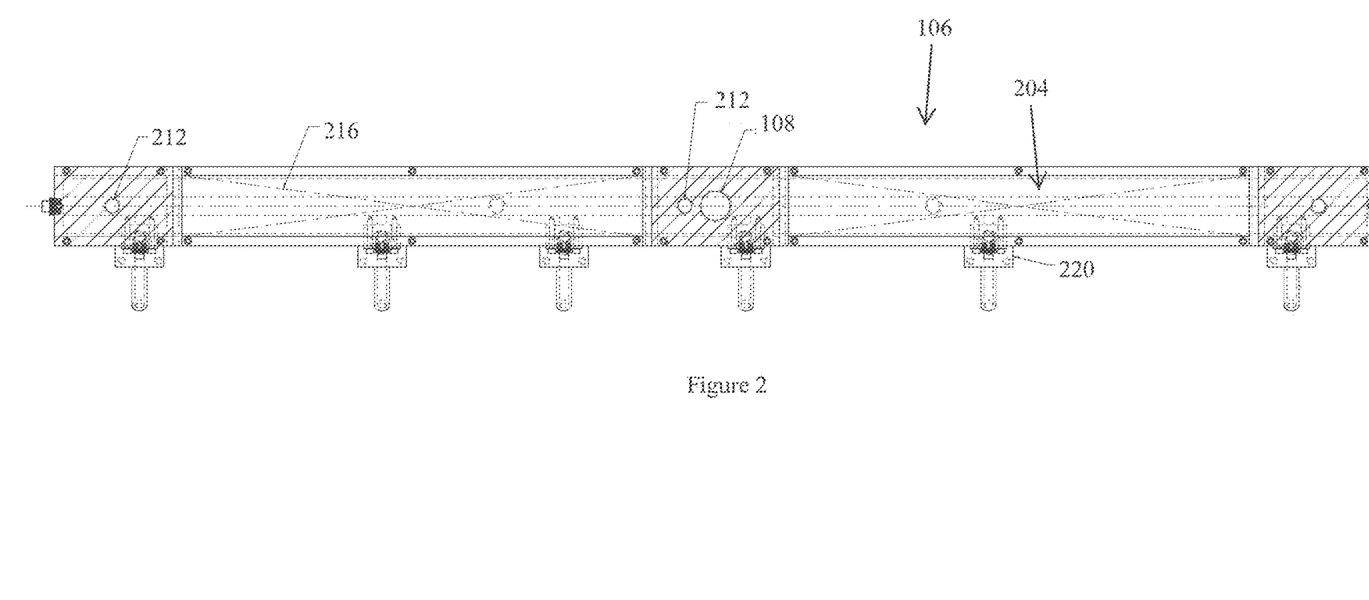
FIG. 2 depicts a schematic plan view of a distribution unit in operative communication with multiple control units in accordance with some embodiments of the present disclosure.
Figure 3:
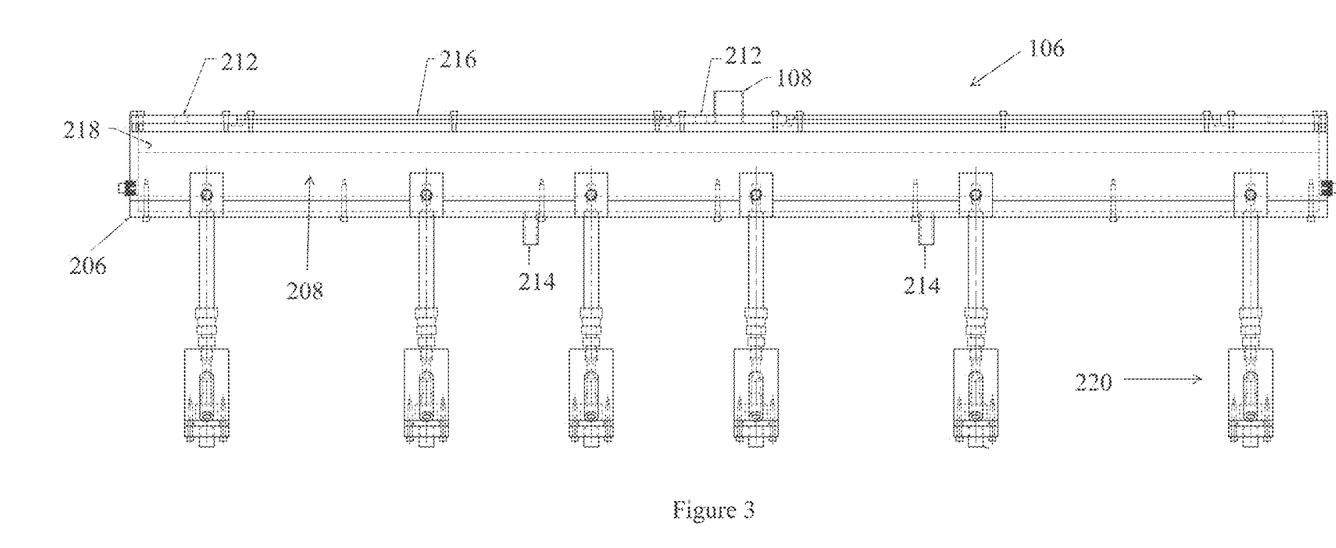
FIG. 3 depicts a schematic elevation view of a distribution unit in operative communication with multiple control units in accordance with some embodiments of the present disclosure.
Figure 4:
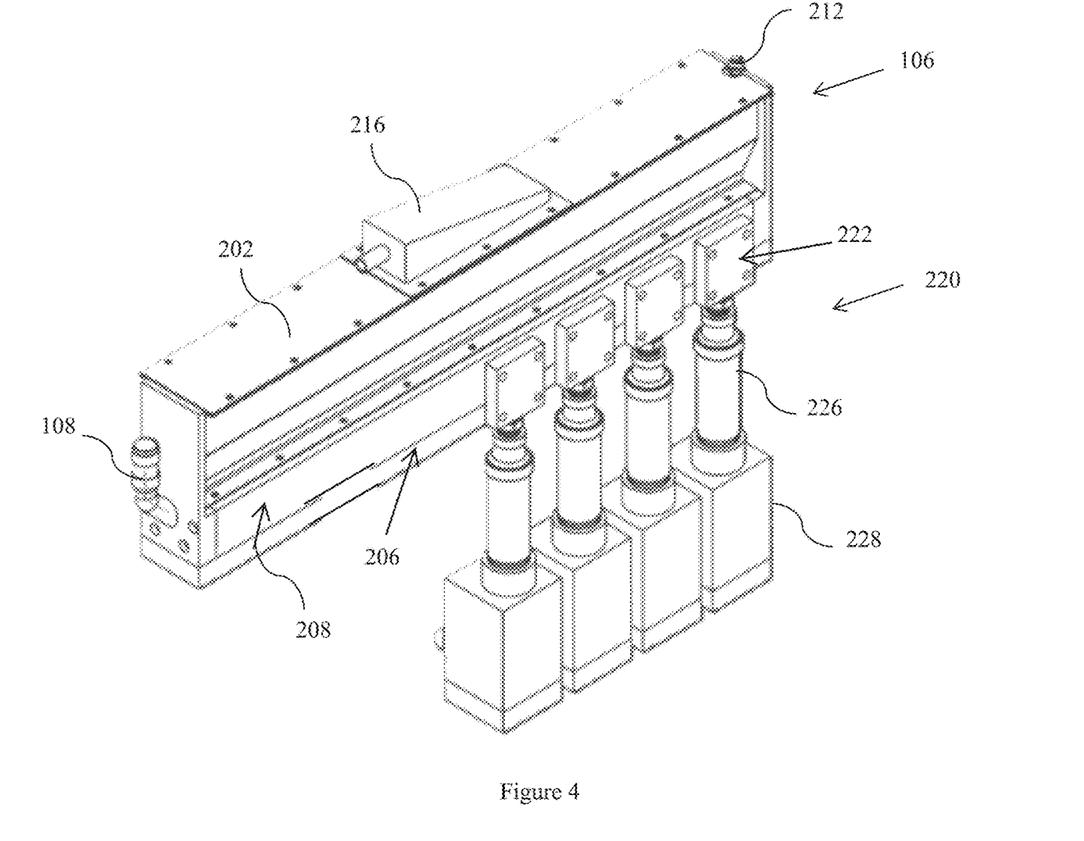
FIG. 4 depicts a schematic view of a distribution unit in operative communication with multiple control units in accordance with some embodiments of the present disclosure.

FIG. 1 depicts a schematic top view of a feed system in accordance with some embodiments of the present disclosure. The feed system 100 is in operative communication with a feed material storage system 102. In some embodiments, the feed material is a solid material that fluidizes (i.e. behaves like a fluid) when subjected to low pressure gas (e.g. air). In some embodiments, the feed material is alumina. In some embodiments, the feed material is smelter grade alumina and/or fluoride laden reacted alumina that has already passed through fume treatment systems (e.g. commingled). In some embodiments, the feed system is calibrated differently depending on the type of alumina that is used. In some embodiments, aluminum fluoride can be added into the distributor units to blend it in with the feed material to the smelting cell.

The feed system 100 is configured to provide feed material to one or more smelting cells 104 via one or more distribution units. In some embodiments, the smelting cell 104 is a conventional Hall-Héroult electrolytic cell. In some embodiments, the smelting cell 104 is an advanced electrolysis cell (e.g. smelter of a non-ferrous metals that include oxygen evolving anodes and/or inert anodes).

Without being bound by a particular mechanism or theory, the feed system 100 is configured to utilize fluidization principles and/or with hydraulic head principles to permit low velocity distribution of feed material to discreet feed points to and within a smelting cell. In some embodiments, the distribution systems can carry feed material in limited length flat sections as well as on gradual downhill slopes similar to those used with gas (e.g. air) gravity conveyors. In some embodiments, the feed system permits the discharge of feed material along the lengths of sloped portions of the feed system (e.g. without the use of diverter valves). Furthermore, the amount of feed material discharged to the smelting cells is controllable without the use of physical gates or weirs. In some embodiments, the feed system is configured with no moving parts exposed to the feed material that would be subject to wear and/or could contribute or create attrition of the feed material.

In some embodiments, the feed intensity is adjustable while maintaining the same overall feed rate per feed point. In some embodiments, waste heat from the smelting process is used to preheat alumina feed material to reduce the overall energy requirements of the smelting process. In some embodiments, there are multiple feed points along the perimeter of the cell. In some embodiments, feed points can be removed from the feed circuit and/or isolated for maintenance, while nearby feed points remain fully functional and continue to feed material into the cell (continues to be operated along it operating parameters). In some embodiments, the amount of feed per individual feed point can be set independent of adjacent feed points even while being supplied from the same distributor unit.

In some embodiments, the feed system 100 comprises one or more distribution units 106. In some embodiments, feed material is provided to each distribution unit 106 from an inlet pipe 108 that is in operative communication with another distribution unit 106 or the feed material storage system 102. In some embodiments, the distribution unit 106 provides feed material to the smelting cell through multiple feed points 110.

In some embodiments, one or more control units (not shown in FIG. 1) are fluidly coupled to each distribution unit 106. The control unit is configured to regulate an amount and/or feed material distributed to the smelting cell 104 from the distribution unit 106.

FIGS. 2-5 depict a schematic view of a distribution unit in operative communication with one or more control units in accordance with some embodiments of the present disclosure. In some embodiments, the distribution unit 106 comprises a body 202. In some embodiments, the body 202 of the distribution unit 106 is made from a material with sufficient strength to support system components (e.g. metal, aluminum and/or aluminum alloys, steel, specialty metals and/or non-reactive with feed materials and/or fluidized feed material). In some embodiments, the body 202 is hollow. In some embodiments, the body 202 has a first volume 204. In some embodiments, the body 202 comprises a top wall, opposing sidewalls, and opposing endwalls to define the first volume 204. In some embodiments, the body 202 comprises a first chamber 206 under the first volume 204, which is configured to distribute gas (e.g. air) to feed material within the first volume via an gas (e.g. air) permeable membrane (fluidizing fabric). In some embodiments, the first volume an area where fluidized material is flowing. In some embodiments, the first chamber 206 is an gas (e.g. air) plenum. As used herein, a gas (e.g. air) plenum is an gas (e.g. air) filled chamber in a structure, which receives gas (e.g. air) for distribution, for example, from a blower or a fan. In some embodiments, the body 202 further comprises a second chamber 208 within the first volume 204 and above the first chamber 206, wherein the second chamber 208 is configured to hold feed material received from the inlet pipe 108. In some embodiments, the second chamber is a feed material plenum. As used herein, a feed material plenum is a feed material filled chamber in a structure, which receives feed material for distribution.

In some embodiments, the body 202 further comprises a first fluidization fabric 210. In some embodiments, the first fluidization fabric 210 is disposed between the top of the first chamber 206 and the bottom of the second chamber 208. In some embodiments, the feed material in the second chamber 208 rests atop the first fluidization fabric 210. In some embodiments, the first fluidization fabric 210 is gas (e.g. air) permeable, allowing gas (e.g. air) from the first chamber 206 to pass through to the feed material in the second chamber 208 and fluidize the feed material. In some embodiments, the first fluidization fabric 210 is not feed material permeable, and thus does not allow any, or substantially any feed material to pass from the second chamber 208 to the first chamber 206. In some embodiments, the first fluidization fabric 210 extends the length and width of the chambers 206, 208. In some embodiments, the first fluidization fabric 210 is a commercially available gas (e.g. air) permeable membrane. An example of suitable fluidizing fabric is FLUI-TEX® E and EX type fluidizing fabrics manufactured by MÜHLEN SOHN.

In some embodiments, the feed material inlet pipe 108 is fluidly coupled to the first volume 204 of the distribution unit 106 to supply the feed material to the second chamber 208. In some embodiments, the feed material inlet pipe 108 is made from a metal and/or metal alloy (e.g. aluminum). In some embodiments, the feed material inlet pipe 108 is located in a center of the distribution unit body, or at an end of the distribution unit body, or at other suitable locations of the distribution unit body. In some embodiments, the distribution unit 106 may comprise one or more feed material inlet pipes 108.

In some embodiments, the body 202 of the distribution unit 106 further comprises one or more pressure ports 212. In some embodiments, pressure ports 212 are used in the distributor units 106 to determine how deep the feed material is within the fluidization zone. In some embodiments, the pressure ports 212 are either tubes or ports located just above the fluidization fabric and connected to electronic manometers that correlate fluid pressure with depth and send signals to control devices which are used to monitor the condition of the feed system and to determine when problems may be occurring so that corrective measures can be undertaken by the control system. In some embodiments, pressure transmitters may be either locally mounted and/or remote.

In some embodiments, the body 202 of the distribution unit 106 further comprises one or more first gas (e.g. air) inlets 214 configured to supply gas (e.g. air) to the first chamber 206. In some embodiments, the first gas (e.g. air) inlet 214 is fluidly coupled to the first chamber. In some embodiments, gas (e.g. air) is supplied to the first gas (e.g. air) inlet 214 from a fan or a blower.

In some embodiments, as gas (e.g. air) from the first chamber 206 passes through the feed material in the second chamber 208 and fluidizes the feed material in the second chamber, the gas (e.g. air) can contain feed material dust particles. In some embodiments, the body 202 comprises a filtration system 216 to remove feed material dust particles from the gas (e.g. air). In some embodiments, the filtration system 216 is a dust filtration fabric within the first volume 204. In some embodiments, the dust filtration fabric is disposed in a third chamber 218 above the second chamber 208 to filter dust from the gas (e.g. air) as it passes through the dust filtration fabric. In some embodiments, the dust filtration fabric is a commercially available filtration fabric typical to that used in commercial dust collection units. In some embodiments, the filtration system is a vent at the top of the body 202. In some embodiments, the third chamber 218 has a first width at a first end proximate the second chamber 208 which gradually expands to a second width at an opposing second end proximate the top of the body 202. The second width is greater than the first width.

Figure 5:
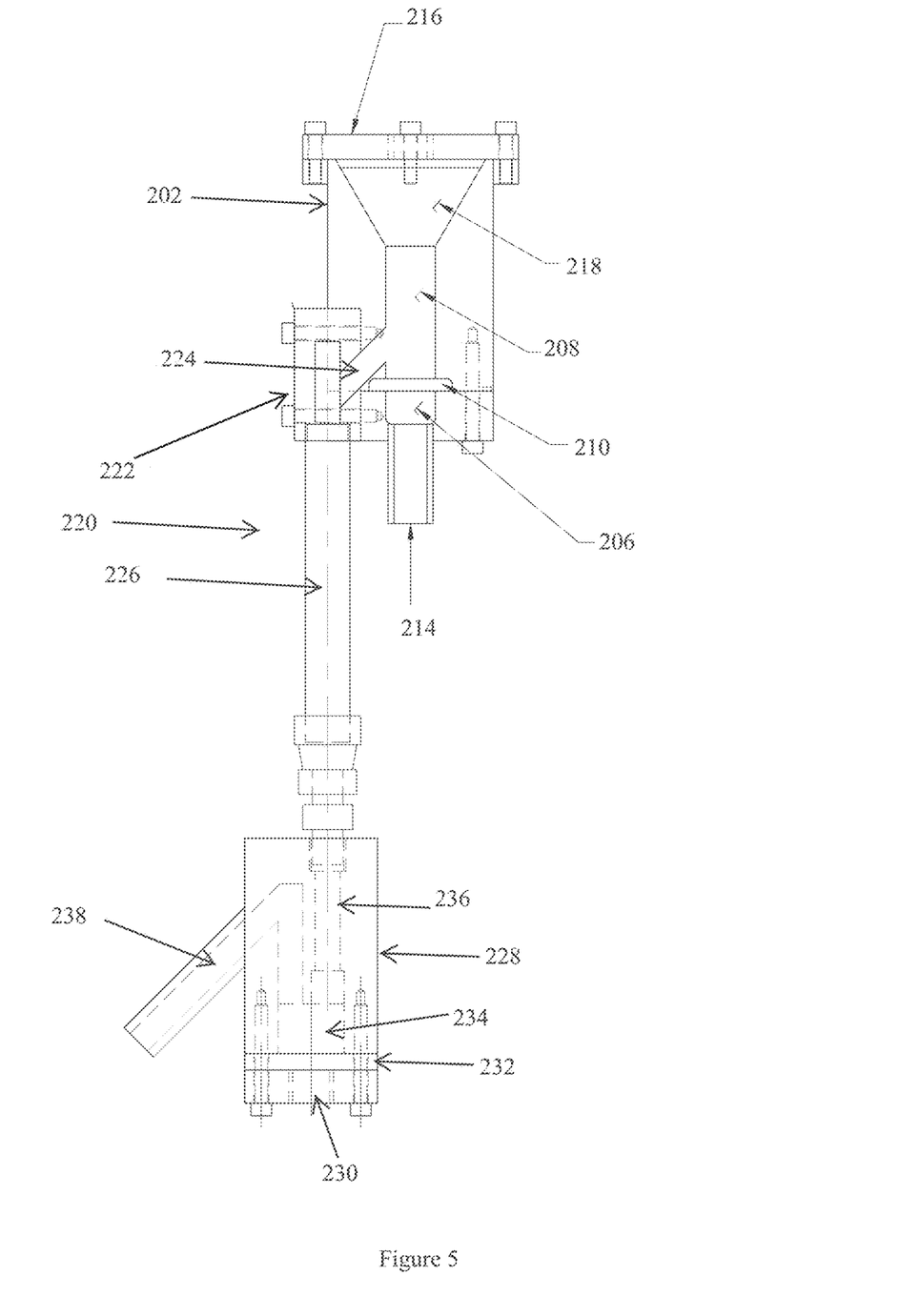
FIG. 5 depicts a schematic cross-sectional view of a distribution unit in operative communication with a control unit in accordance with some embodiments of the present disclosure.
Figure 6:
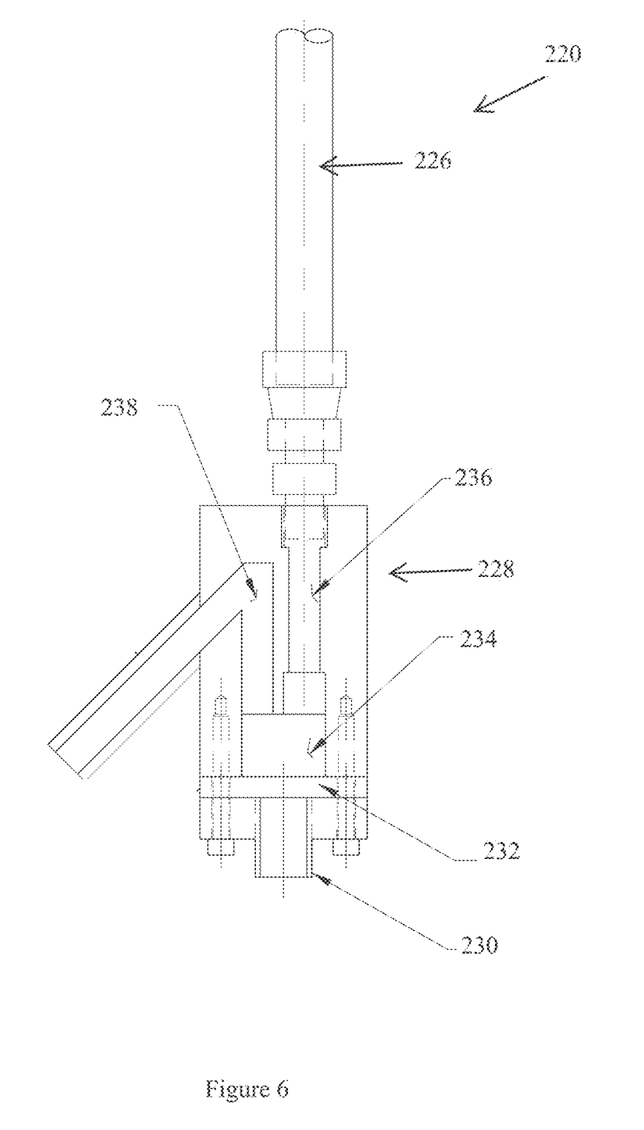
FIG. 6 depicts a schematic cross-section view of the control unit in accordance with some embodiments of the present disclosure.

FIGS. 2-5 depict a schematic view of a distribution unit in operative communication with one or more control units in accordance with some embodiments of the present disclosure. FIG. 6 depicts a schematic cross-section view of the control unit in accordance with some embodiments of the present disclosure. In some embodiments, the control unit 220 comprises a fourth chamber 226 configured to hold the feed material provided from the distribution unit 106. In some embodiments, the fourth chamber is a degassing (e.g. de-aeration) chamber. In some embodiments, the fourth chamber 226 is fluidly coupled to the second chamber 208. In some embodiments, the fourth chamber 226 is fluidly coupled to the second chamber 208 via tube 224 and discharge block 222 as shown in FIG. 5. Fluidized feed material flows into the volume 226 where it is no longer in contact with gas (e.g. air) from the distribution unit 106. Accordingly, the feed material may no longer be fluidized and may not behave as a liquid.

In some embodiments, the control unit 220 further comprises a feeder unit 228 fluidly coupled to the fourth chamber 226. In some embodiments, the feeder unit 228 comprises a second gas (e.g. air) inlet 230. In some embodiments, gas (e.g. air) supplied from the gas (e.g. air) inlet 230 passes through a second fluidization fabric 232 to a fifth chamber 234. In some embodiments, a material passageway 236 has a first end that is fluidly coupled to the fifth chamber and has a second end that is fluidly coupled to the fourth chamber 226. In some embodiments, gas (e.g. air) from the second gas (e.g. air) inlet contacts the feed material in the fifth chamber 234 and fluidizes the feed material. In some embodiments, a material discharge pipe 238 is fluidly coupled to the fifth chamber 234. In some embodiments, the fluidized feed material is discharged from the material discharge pipe 238 to a smelting cell 104 or to another distribution unit 106.

In some embodiments, the degassing (e.g. de-aeration) chamber permits the fluidized incoming feed material from the distributor unit to potentially de-fluidize, thereby creating a constant head to the inlet of the feeder unit. In some embodiments, the constant head to the inlet of the feeder unit is configured to eliminate the need for tight control of feed material depth within the distributor units and permits the feeder unit to quickly respond with feed material flow when needed. In some embodiments, the internal portions of the feeder unit are arranged to permit the hydraulic pressure to immediately push material through the feeder unit as soon as the fluidization gas (e.g. air) is activated. In some embodiments, the fluidization gas (e.g. air) to each feeder unit is controlled by a valve (e.g. normally closed solenoid valve operating on 24 VDC; which can be directly interfaced with a PLC controller). In some embodiments, feed material doses from the feeder unit can be as small as fractions of a gram with gas (e.g. air) on times as low as 0.05 seconds with multiple pulses of gas (e.g. air) per second. In some embodiments, feed material doses can be several grams to hundreds of grams provided intermittently depending on the on-time of the solenoid valve. In some embodiments, the amount of feed material provided to smelting cell is customizable to the size of the smelting cell as well as to the need to sometimes feed more or less feed material depending on the operational circumstances of the smelting cell. In some embodiments, the fluidization pressure on the feeder units is the same as that required for the distributor units and can be supplied by the same gas (e.g. air) source. In some embodiments, feeder unit sizes are variable and customizable.

Figure 8:
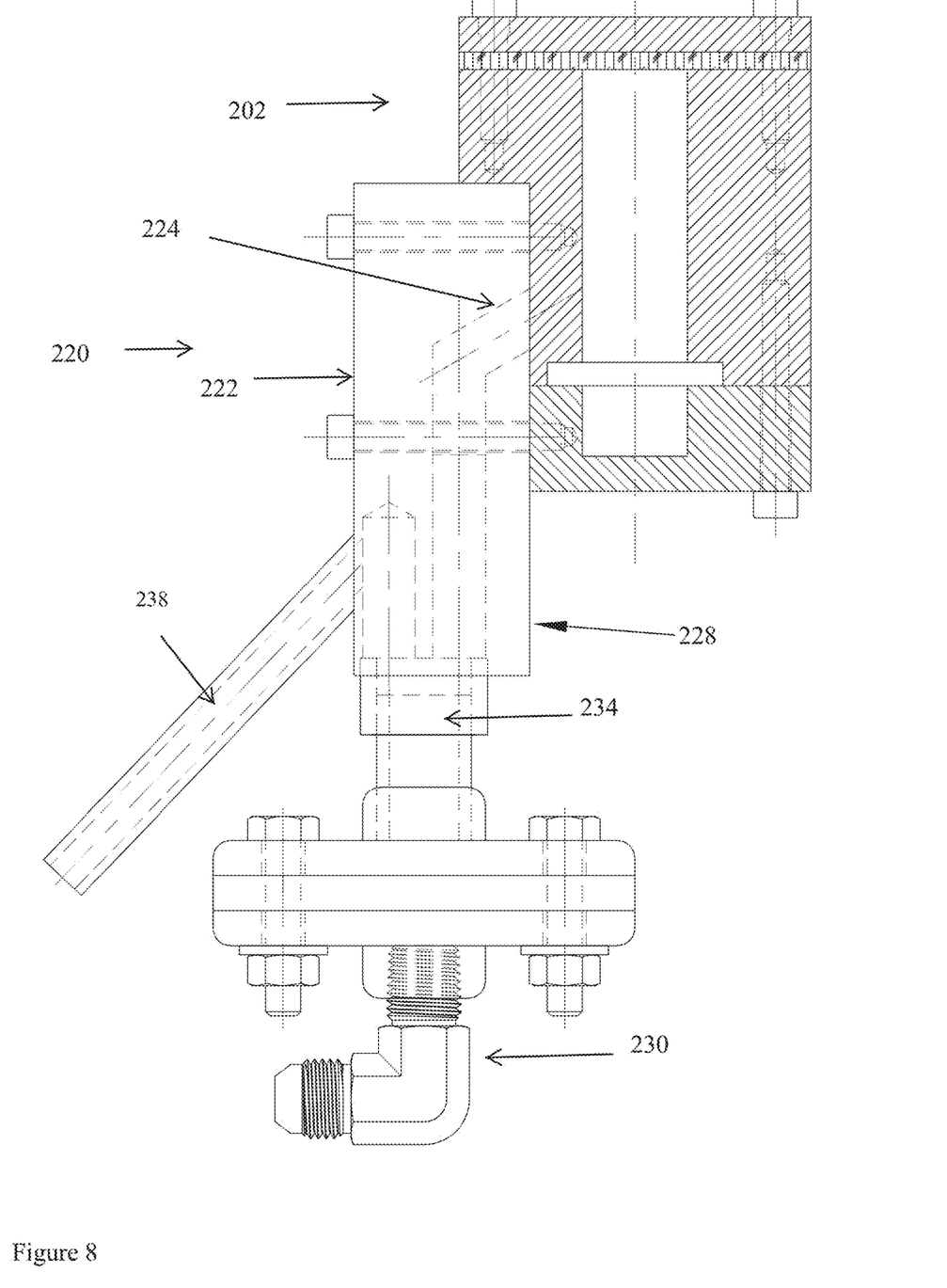
FIG. 8 depicts a schematic cross-section view of a distribution unit in operative communication with a control unit in accordance with some embodiments of the present disclosure

In some embodiments, as depicted in FIG. 8, the control unit 220 does not have a fourth chamber 226. In some embodiments, as depicted in FIG. 8, the control unit 220 is fluidly coupled to the distribution unit 202 via tube 224 and discharge block 222.

In some embodiments, the feeder unit 228 further comprises a point of entry device configured to break through process material that can clog the opening of the material discharge pipe 238. In some embodiments, point of entry device is configured to break through a crust formed at an opening of the smelting cell to allow feed material to enter the smelting cell.

Figure 7A:
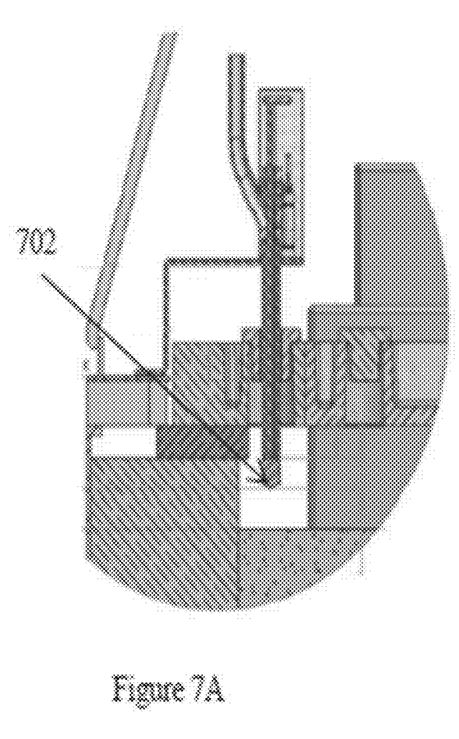
FIG. 7A-7B depicts a schematic cross section view of a feeder unit having a point of entry device in accordance with some embodiments of the present disclosure.
Figure 7B:
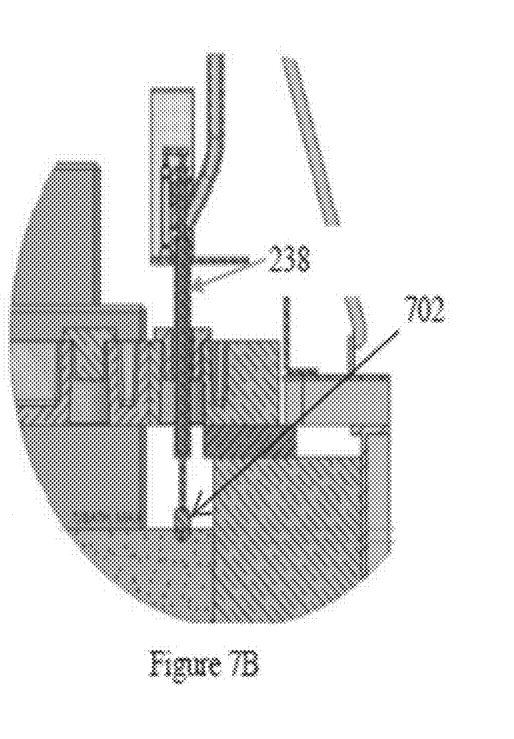

FIG. 7A-7B depicts a schematic of a feeder unit having a point of entry device in accordance with some embodiments of the present disclosure. In some embodiments, a material discharge pipe 238 has a crust breaker for breaking through any crust or other obstruction that may form on the top of the electrolyte bath and prevent feed material from mixing in the liquid portion of the bath. In some embodiments, the crust breaker is a piston 702 mounted to the opening of the material discharge pipe 238. In some embodiments, metered feed material travels through the material discharge pipe 238 immediately before it is injected into the cell at a feed point. In some embodiments, the piston can be extended from the opening of the material discharge pipe 238 to break through obstructions in the bath. In some embodiments, when the piston is extended as depicted in FIG. 7B, the material discharge pipe 238 is open, allowing feed material to enter the cell at a feed point. In some embodiments, when the piston is retracted, as depicted in FIG. 7A, the material discharge pipe 238 is closed and feed material is prevented from entering the cell. In some embodiments, when the piston is retracted, feed material accumulates in the material discharge pipe 238 above the piston. In some embodiments, when the piston is retracted, the material discharge pipe 238 is sealed with respect to fumes from the bath, preventing the bath fumes from mixing with the feed material inside of the material discharge pipe 238 and clogging the material discharge pipe 238. In some embodiments, when the piston is in a partially extended position, feed material is dispensed into a feed point of the cell, but the piston does not enter the bath. In some embodiments, when the piston is in a fully extended position, feed material is dispensed into a feed point of the cell and the piston enters the bath, breaking any obstructions on the bath at the feed point.

In some embodiments, the piston may travel a first distance to a fully extended position. In some embodiments, the first distance is 3 to 12 inches, or 5 to 12 inches, or 7 to 12 inches, or 9 to 12 inches, or 11 to 12 inches, or 3 to 9 inches, or 3 to 7 inches, or 3 to 5 inches. In the fully extended position, the piston acts as a crust breaker, breaking up any crust or other obstruction blocking feed material from entering the liquid portion of the bath. In some embodiments, the piston may travel a second distance (e.g. 0.1 to 3 inches) to a partially extended position. In some embodiments, the second distance is 0.1 to 3 inches, or 1 to 3 inches, or 2 to 3 inches, or 0.1 to 2 inches, or 0.1 to 1 inches. In the partially extended position, the piston does not extend into the liquid portion of the bath. In some embodiments, in both the fully and partially extended positions, the material discharge pipe 238 is open, allowing feed material to exit the material discharge pipe 238.

In some embodiments, the feed system 100, except where otherwise noted, is constructed of aluminum with bolted designs that utilize helicoil inserts in the aluminum with shoulder bolts to maintain known sealing pressures and compression on the various fluidization fabrics used in the distributors and seal leg devices. In some embodiments, the material component construction (e.g. aluminum construction) results in a system that does not become magnetic around the smelting cells In some embodiments, at least one section of the feed gas (e.g. air) gravity conveyor that is non-conductive (e.g. constructed out of fiberglass or similar composite material) to maintain electrical isolation between the smelting cell and adjacent building structures. In some embodiments, the feed material distributor units can be about 0.5 inch wide to about 5 inches wide at the fluidization fabric surface depending on the amount of feed material that is to be distributed.

In some embodiments, the various fluidization fabrics described herein may have different characteristics within the feed system, such as rated permeability, thickness, ply, material, etc. depending on where and how they are used. In some embodiments, fluidization fabrics used within the feed system can be employed with commercially available components.

In some embodiments, the gas (e.g. air) used for fluidization is filtered for particulate. In some embodiments, the gas (e.g. air) used for fluidization can be generated by a centrifugal blower or a positive displacement blower. In some embodiments, the gas (e.g. air) consumption for feed system described in this disclosure will be close to the minimum fluidization requirement of alumina (e.g. minimizing waste of gas). Accordingly, the amount of gas (e.g. air) to be filtered for dust after flowing through the feed material is minimal as well. In some embodiments, localized filtration fabric may be used on special gas (e.g. air) release chambers equipped with automatic cleaning mechanisms to eliminate the need for external ducting and fans normally associated with dust collection systems. In some embodiments, vent hoods are used to carry particulate laden gas (e.g. air) from the distribution units to either dust collection systems or to divert it back into the smelting cell enclosure where it mixes with the normal fume exhaust from the smelting cell.

In some embodiments, a method of feeding a smelting cell using embodiments of the feed system 100 described above, includes: providing a feed material to a distribution unit; flowing gas (e.g. air) through the distribution unit, wherein the gas (e.g. air) fluidizes the feed material; and flowing a controlled amount of fluidized feed material from the distribution unit to a smelting cell via a control unit.

In some embodiments, flowing a controlled amount of fluidized feed material comprises: flowing the fluidized feed material to a control unit as described above, wherein the feed material is de-fluidized in the control unit chamber (e.g. the fourth chamber 226). In some embodiments, gas (e.g. air) is provided to the feeder unit for a first period of time, for example for at least about 0.5 seconds, to fluidize the feed material in the seal leg 228 and distribute a predetermined amount of feed material to the smelting cell.

In some embodiment, a method of feeding feed material to a destination, comprises: providing feed material to a distribution unit; flowing gas (e.g. air) through the distribution unit, wherein the gas (e.g. air) fluidizes the feed material; and flowing the fluidized feed material to a control unit comprising: a feeder unit fluidly coupled to the distribution unit; providing gas (e.g. air) for a first period of time to the feeder unit to fluidize the feed material in the control unit; and discharging a controlled amount of the fluidized feed material from a discharge spout in the feeder unit to the smelting cell.

It will be understood that the embodiments described herein are merely exemplary and that a person skilled in the art may make many variations and modifications without departing from the spirit and scope of the disclosed subject matter. All such variations and modifications are intended to be included within the scope of the disclosure.

What is claimed is:

1. A feed system for distributing fluidized feed material to one or more electrolytic cells, comprising:
   for each electrolytic cell, at least one distribution unit configured to fluidize feed material; and
   a plurality of control units, located outside the electrolytic cell along a perimeter thereof, fluidly coupled to the distribution unit, wherein each of the control units comprises:
     a chamber fluidly coupled to the distribution unit and configured to hold the feed material provided from the distribution unit; and
     a feeder unit fluidly coupled to the chamber, the feeder unit comprising:
       a second gas inlet configured to provide gas for a period of time to the chamber for fluidizing the feed material held in the chamber;
       a material discharge pipe fluidly coupled to the chamber and to a feed point of the electrolytic cell, and configured to inject the feed material fluidized in the chamber into the electrolytic cell; and
     wherein the feed system allows providing fluidized feed material to each electrolytic cell through multiple feed points located along the perimeter of each electrolytic cell; and
   wherein the amount of fluidized feed material provided to the electrolytic cell is controllable for each of the plurality of control units by varying the period of time during which gas is provided to the chamber.

2. The feed system of claim 1, wherein the feed material is alumina.

3. The feed system of claim 1, wherein the distribution unit comprises:
   a body having a first volume; and
   a first chamber, within the first volume, at a bottom of the body, wherein the first chamber is configured to distribute gas to the feed material within the first volume; and a second chamber within the first volume and above the first chamber, wherein the second chamber is configured to hold the feed material.

4. The feed system of claim 3, wherein the distribution unit comprises:
   a first fluidization fabric between the first chamber and the second chamber, wherein the feed material rests atop the first fluidization fabric.

5. The feed system of claim 4, wherein the distribution unit further comprises:
   a feed material inlet pipe fluidly coupled to the first volume, wherein the feed material inlet pipe is configured to supply the feed material to the second chamber.

6. The feed system of claim 5, wherein the distribution unit further comprises:
   a pressure port, wherein the pressure port is configured to measure a depth of the feed material.

7. The feed system of claim 6, wherein the distribution unit further comprises:
   a first gas inlet in the body, wherein the gas inlet is configured to supply an gas flow to the first chamber.

8. The feed system of claim 7, wherein the distribution unit further comprises:
   a dust filtration fabric within the first volume, wherein the dust filtration fabric is disposed above the second chamber.

9. The feed system of claim 7, wherein the distribution unit further comprises:
   a vent at a top of the body.

10. The feed system of claim 1, wherein the material discharge pipe of the feeder unit comprises:
    a crust breaker configured to break a crust formed at the top of an electrolytic bath of the electrolytic cell, the crust breaker comprising a piston mounted to an opening of the material discharge pipe, the piston being configured to move the crust breaker between:
      a retracted position where the crust breaker is configured to close the opening of the material discharge pipe;
      a partially extending position where the crust breaker allows the feed material to be dispensed into the electrolytic cell; and
      a fully extended position where the crust breaker enters the bath for breaking any obstructions on the bath at the feed point.

11. A method for distributing fluidized feed material to one or more electrolytic cells, comprising:
    providing a feed material to a distribution unit,
    flowing gas through the distribution unit, wherein the gas fluidizes the feed material within the distribution unit;
    flowing a controlled amount of fluidized feed material from the distribution unit to a plurality of control units located outside the electrolytic cell along a perimeter thereof and fluidly coupled to the distribution unit;
    flowing gas through each of the control units for a period of time, wherein the gas fluidizes the feed material within each of the control units; and
    providing fluidized feed material to each electrolytic cell through multiple feed points fluidly connected to one of the control units and located along the perimeter of each electrolytic cell, wherein the amount of fluidized feed material provided to the electrolytic cell is controllable for each of the plurality of control units by varying the period of time during which gas is provided to the chamber.

12. The method of claim 11, wherein the feed material is alumina.

13. The method of claim 11, wherein flowing the controlled amount of fluidized feed material comprises:
flowing the fluidized feed material to each of the control units comprising:
a chamber fluidly coupled to the distribution unit and configured to hold the feed material provided from the distribution unit; and
a feeder unit fluidly coupled to the chamber,
wherein the feed material is de-fluidized in the chamber.

14. The method of claim 13, further comprising:
intermittently providing doses of feed material to the electrolytic cell by providing multiple pulses of gas to the feeder unit to fluidize the feed material in the chamber.

15. The method of claim 14, further comprising:
discharging the fluidized feed material from a discharge spout in the feeder unit to the electrolytic cell.

16. The method of claim 15, further comprising:
prior to discharging the fluidized feed material, extending a plunger from:
a retracted position where the plunger is configured to close an opening of the discharge spout;
a partially extending position where the plunger allows the feed material to be dispensed into the electrolytic cell; and
a fully extended position where the plunger enters an electrolyte bath of the electrolytic cell for breaking any obstructions on the bath at the feed point.

17. The method of claim 11, wherein flowing gas through the distribution unit further comprises:
filtering the gas from the distribution unit that passes through the feed material to remove feed material dust particles.

18. A method of feeding alumina to an electrolytic cell through multiple feed points, comprising:
providing alumina to a distribution unit;
flowing gas through the distribution unit, wherein the gas fluidizes the alumina;
flowing the fluidized alumina to a plurality of control units located outside the electrolytic cell along a perimeter thereof and comprising:
a chamber fluidly coupled to the distribution unit and configured to hold the alumina provided from the distribution unit, wherein the alumina is de-fluidized in the chamber, and
a feeder unit fluidly coupled to the chamber;
providing gas for a period of time to the feeder unit of each control unit to fluidize the alumina in the chamber; and
discharging a controlled amount of the fluidized alumina from a discharge spout in the feeder unit of each control unit to the electrolytic cell;
wherein the feeder unit allows providing fluidized alumina to the electrolytic cell through the multiple feed points located along the perimeter of the electrolytic cell; and
wherein the amount of fluidized alumina provided to the electrolytic cell is controllable for each of the plurality of control units by varying the period of time during which gas is provided to the chamber.

19. The method of claim 18, wherein the step of providing gas for a period of time to the feeder unit of each control unit to fluidize the alumina in the chamber comprises providing multiple pulses of gas to the feeder unit to intermittently provide doses of feed material to the electrolytic cell.

20. The method of claim 18, further comprising:
prior to discharging a controlled amount of the fluidized alumina from a discharge spout in the feeder unit of each control unit to the electrolytic cell, extending a plunger from:
a retracted position where the plunger is configured to close an opening of the discharge spout;
a partially extending position where the plunger allows the feed material to be dispensed into the electrolytic cell; and
a fully extended position where the plunger enters an electrolyte bath of the electrolytic cell for breaking any obstructions on the bath at the feed point.

* * * * *